Figure 1:
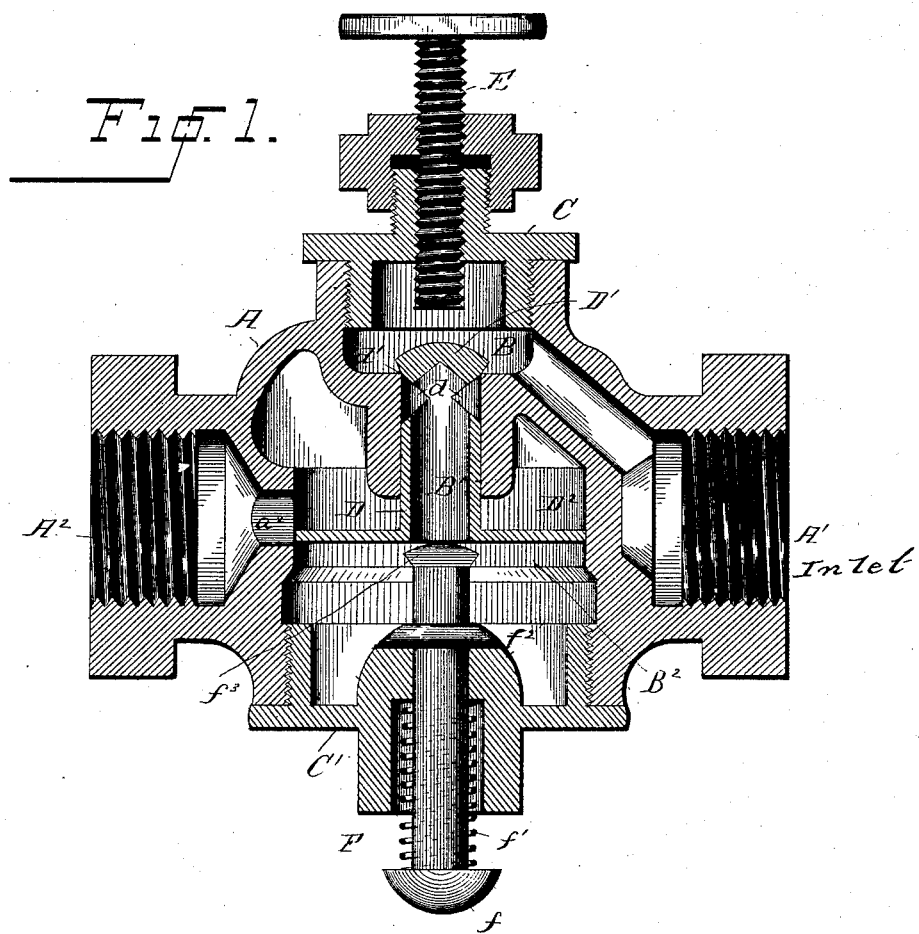

(No Model.) 2 Sheets—Sheet 1.

J. S. KLEIN.
SHUT-OFF VALVE FOR GAS SERVICE PIPES.

No. 371,075. Patented Oct. 4, 1887.

Witnesses
Wm H. Jones,
F. W. Combs.

Inventor
John S. Klein
per Hallock & Hallock
attys.

(No Model.) 2 Sheets—Sheet 2.

J. S. KLEIN.
SHUT-OFF VALVE FOR GAS SERVICE PIPES.

No. 371,075. Patented Oct. 4, 1887.

Witnesses:
R. H. Porter
Chas. B. Lechner

Inventor.
John S. Klein

UNITED STATES PATENT OFFICE.

JOHN S. KLEIN, OF OIL CITY, PENNSYLVANIA.

SHUT-OFF VALVE FOR GAS-SERVICE PIPES.

SPECIFICATION forming part of Letters Patent No. 371,075, dated October 4, 1887.

Application filed November 26, 1886. Serial No. 219,948. (No model.)

*To all whom it may concern:*

Be it known that I, JOHN S. KLEIN, a citizen of the United States, residing at Oil City, in the county of Venango and State of Pennsylvania, have invented certain new and useful Improvements in Shut-Off Valves for Gas-Service Pipes; and I do hereby declare the following to be a full, clear, and exact description of the invention, such as will enable others skilled in the art to which it appertains to make and use the same.

This invention relates to shut-off valves for gas-service pipes; and it consists in certain improvements in the construction thereof, as will be hereinafter fully described, and pointed out in the claims.

The object of the invention is to provide a shut-off valve for gas-service pipes which will automatically close when the flow of gas ceases, and will not open again when the flow resumes. Such a valve is particularly desirable in fuel-gas-service pipes, and especially so where natural gas is used, for it often occurs from one cause or another that the flow of this gas is interrupted, and if it is not observed and the valves are not closed the gas will not be ignited when the flow resumes, and it will escape into the apartment, and, being often inodorous, it will not be discovered until an explosion occurs or the occupants are smothered.

I am aware that many forms of valves have been devised to automatically close the pipes when the pressure is removed. Such devices are commonly placed on the pipe as it enters the building at a point back of all of the branches within the building, and so cuts off the supply from the building when the pressure in the mains ceases, and hence it becomes necessary, when the shut-off occurs, to close all the cocks at the burners, and then reopen the shut-off valve when the gas again flows in the mains. This may necessitate several trips to the cellar to open the valve to find if there is a flow of gas.

My valve is intended to take the place of the ordinary valve at each burner, and serve not only as an ordinary shut-off, but also as an automatic shut-off.

When a building is supplied with my valves, each burner in it will be automatically shut off if the flow of gas in the mains ceases, and no attention will need to be paid to them except to relight them when the flow of gas resumes.

Figure 3:
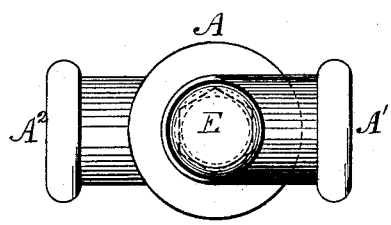
Figure 2:
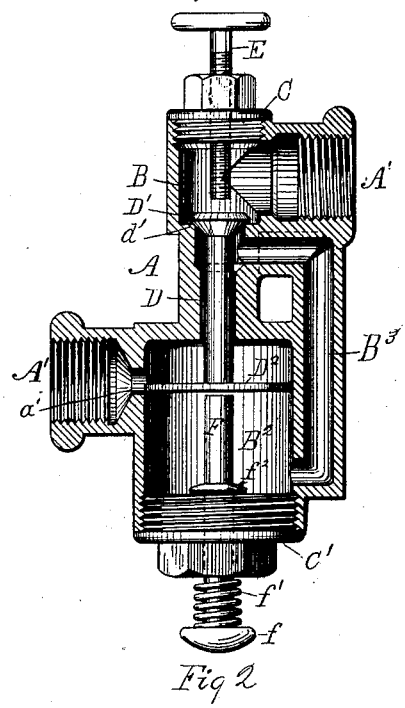

My device is illustrated in the accompanying drawings, as follows:

Figure 1 is a vertical longitudinal section through the valve-case, with internal parts in elevation. Fig. 2 is a like view of an alternative construction. Fig. 3 is a top view of the valve shown in Fig. 2.

The construction and operation are as follows:

A is the valve case or body, which has a nipple, A', for connecting with the service-pipe, and a nipple, $A^2$, for connecting with the burner. The valve-case A has two chambers, B and $B^2$, and communication is established between them by a proper duct. In Fig. 1 the communicating duct is marked B', and is within the valve-stem D. In Fig. 2 a special duct is provided, marked $B^3$. There is also an opening between the two chambers, in which plays the stem D of the check-valve. D' is the head of the check-valve, and d' is its seat. Below the head of the valve in Fig. 1 there are openings d into the duct B'. In the chamber $B^2$ there is a disk, $D^2$, attached to the valve-stem D, which fills the cylindrical bore of said chamber and acts as a piston. This piston has a sufficiently loose fit in the chamber $B^2$ to move freely, and the valve-stem D fits loosely in its place, so that the vertical action of the valve will be free and unencumbered by friction. In the construction shown in Fig. 1, when the valve is raised from its seat, the flow of gas is through the openings d, thence through the duct B' in the valve-stem, and out into the chamber $B^2$ below the piston. In the construction shown in Fig. 2 the flow of gas when the valve is open is through the duct $B^3$ into the chamber $B^2$. It will be seen that in each of these forms the greatest pressure of gas when the valve is open will be on the under side of the piston, and hence the valve will be maintained off its seat as long as the flow of gas is uninterrupted; but if the flow of gas is interrupted the valve will fall of its own weight and become seated, and when the flow of gas is resumed it will be checked by the valve from entering the chamber B² until the valve is lifted from its seat.

The means for lifting the valve from its seat may be varied. I show, perhaps, the most simple device. It consists of a spring-bolt, F, in the lower plug, C'. This bolt has a collar, $f^2$, on the inside of the chamber B², which acts as a valve-head to prevent escape of gas past the bolt, and a button or head, $f$, and a spring, $f'$, without the chamber. By pressing on the head $f$ the bolt will be driven into the chamber and will push up the valve and open it, and when the pressure on the head $f$ is removed the spring will react upon the bolt and seat the collar $f^2$. In the construction shown in Fig. 1 the bolt is flattened at its upper ends, at $f^3$, so it will not close the mouth of the duct B' when it is in contact with the valve. In the upper plug, C, there is an adjusting-screw, E, which enters the chamber B above the valve-head D. This screw may be screwed down and close the valve, or left at any desired distance above the valve, and thus regulate the degree to which the valve may open, and so regulate the quantity of gas that may pass the valve.

I am aware of the constructions shown in Letters Patents of the United States Nos. 312,724, 334,639, and 48,166, and I disclaim the same as forming any part of my invention; nor do said devices contain the elements of my construction, for they do not show a check-valve with a piston connected with its stem, which piston works in a cylinder formed in the outlet-chamber of the valve, and is there operated upon by the fluid after it has passed said check-valve.

What I claim as new is—

1. In a shut-off valve, the combination, substantially as set forth, of an inlet-chamber and an outlet-chamber, a check-valve closing the port between said chambers, a piston-chamber formed in the said outlet-chamber, a piston working in said piston-chamber, which is connected with said check-valve operatively and is operated upon by the flow of gas through said outlet-chamber, and means, substantially as set forth, for moving said valve and piston manually.

2. In a shut-off valve for gas-service pipes, the combination, substantially as set forth, of the case A, having chambers B and B², a valve for regulating the flow of gas through said chambers, consisting of the head D', stem D, with duct B' therein, and piston D², a screw for manually seating said valve, and a lifter for manually opening said valve.

In testimony whereof I affix my signature in presence of two witnesses.

JOHN S. KLEIN.

Witnesses:
J. B. McALLISTER,
TOM A. MACALLISTER.